United States Patent
Hildenbrand et al.

(10) Patent No.: US 12,197,613 B2
(45) Date of Patent: Jan. 14, 2025

(54) DATA AUTHORIZATION EVALUATION FRAMEWORK

(71) Applicant: SAP SE, Walldorf (DE)

(72) Inventors: Patrick Hildenbrand, Neulußheim (DE); Vytas Cirpus, Waldsee (DE)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 18/076,933

(22) Filed: Dec. 7, 2022

(65) Prior Publication Data

US 2024/0193288 A1   Jun. 13, 2024

(51) Int. Cl.
H04L 29/06 (2006.01)
G06F 21/60 (2013.01)
G06F 21/62 (2013.01)

(52) U.S. Cl.
CPC ........ G06F 21/6218 (2013.01); G06F 21/604 (2013.01); *G06F 2221/2113* (2013.01); *G06F 2221/2141* (2013.01)

(58) Field of Classification Search
CPC .............. G06F 21/6218; G06F 21/604; G06F 2221/2113; G06F 2221/2141
See application file for complete search history.

(56) References Cited

U.S. PATENT DOCUMENTS

| | | | | |
|---|---|---|---|---|
| 5,784,560 A | * | 7/1998 | Kingdon | G06F 21/6218 709/201 |
| 7,552,223 B1 | * | 6/2009 | Ackaouy | G06F 16/10 709/213 |
| 10,664,538 B1 | * | 5/2020 | Pallemulle | G06F 16/9038 |
| 11,256,665 B2 | * | 2/2022 | Prahlad | G06F 16/119 |
| 2009/0248882 A1 | * | 10/2009 | Takagi | G06Q 10/10 709/229 |
| 2014/0123316 A1 | * | 5/2014 | Leggette | H04L 67/1097 726/28 |
| 2014/0308955 A1 | * | 10/2014 | Won | H04W 36/0066 455/436 |

* cited by examiner

*Primary Examiner* — Shawnchoy Rahman
(74) *Attorney, Agent, or Firm* — Klarquist Sparkman, LLP

(57) ABSTRACT

Techniques and solutions are provided for evaluating data access restrictions. Data access restrictions are defined for a first computing object that includes data, or is usable to retrieve data, from one or more other computing objects. Data defining the data access restrictions is stored in attributes for a first plurality of computing objects. Values for less than all of the attributes are copied to a second plurality of computing objects, where the second plurality of computing objects is less than the first plurality of computing objects. A data access authorization request is received that includes, or information sufficient to identify, a user or user group identifier, and an identifier of the first computing object. Data is retrieved from at least a portion of one or more computing objects, and is returned in response to the request, or an authorization result is determined and returned in response to the request.

20 Claims, 23 Drawing Sheets

```
@AccessControl.authorizationCheck: #NOT_ALLOWED
@ObjectModel: {
  representativeKey: 'AccessControlHeaderUUID', usageType: {
    dataClass:      #TRANSACTIONAL,
    serviceQuality: #A,
    sizeCategory:   #L
  }
}
@EndUserText.label: 'Access Control List Header'
define root view entity ZPH_R_AccessControlListTP as select from ZPH_R_AccessControlList
  composition [0..*] of ZPH_R_AccCtrlObjAuthznTP     as _ACLEntry
  composition [0..*] of ZPH_R_ACLObjRefByObjUUIDTP   as _RefByObjectUUID
  composition [0..*] of ZPH_R_ACLObjRefByObjNumberTP as _RefByObjectNumber
  composition [0..*] of ZPH_R_AccessControlUserTP    as _AuthorizedUser
  composition [0..*] of ZPH_R_AccessControlReasonTP  as _ACLReason {
  key AccessControlHeaderUUID,
    AccCtrlReferencedObjectUUID,
    AccCtrlReferencedObjectNumber, //Added for PS-OP
    AccessControlTypeCode,
    AccessControlDescription,
    CreationDateTime,
    Createdby,
    LastChangeDateTime,
    LastChangedBy,
    AccCtrlLastChangedDateTime,
    AccCtrlLastChangedBy, _ACLEntry,
    _RefByObjectUUID,
    _RefByObjectNumber,
    _AuthorizedUser,
    _ACLReason
}
```

FIG. 4A

```
@AccessControl.authorizationCheck: #NOT_ALLOWED
@ObjectModel: {
  representativeKey: 'AccCtrlObjAuthorizationUUID', usageType: {
    dataClass:      #TRANSACTIONAL,
    serviceQuality: #A,
    sizeCategory:   #L
  }
}
@EndUserText.label: 'Access Control List entry'
define view entity ZPH_R_AccCtrlObjAuthznTP as select from ZPH_R_AccCtrlObjAuthorization as OAT
 /* my Parent */
 association to parent ZPH_R_AccessControlListTP as _Root
   on $projection.AccessControlHeaderUUID = _Root.AccessControlHeaderUUID
 /* root of a user group */
 association [1] to ZPH_R_AccessControlListTP as _UserGroup
   on $projection.AccessControlUserGroupUUID = _UserGroup.AccessControlHeaderUUID
 /* root of object references */
 association [1] to ZPH_R_AccessControlListTP as _ObjectReference
   on $projection.AccessControlledObjectUUID = _ObjectReference.AccessControlHeaderUUID {
 key AccCtrlObjAuthorizationUUID,
   AccessControlHeaderUUID, AccCtrlReferencedObjectUUID,
   AccessControlRestrictionCode, AccessControlUserGroupUUID, AccessControlledObjectUUID, Creationdatetime,
   Createdby,
   LastChangeDateTime,
   LastChangedBy, _Root,
   _UserGroup,
   _ObjectReference
}

ZPH_R_ACLObj
```

FIG. 4B

```
@AccessControl.authorizationCheck: #NOT_ALLOWED
@ObjectModel: {
  representativeKey: 'AccessControlReferenceUUID', usageType: {
    dataClass:      #TRANSACTIONAL,
    serviceQuality: #A,
    sizeCategory:   #XL
  }
}
@EndUserText.label: 'Reference to object control. by this ACL'
define view entity ZPH_R_ACLObjRefByObjUUIDTP as select from ZPH_R_ACLObjRefByObjectUUID as ORT
/* my Parent */
association to parent ZPH_R_AccessControlListTP as _Root
  on $projection.AccessControlHeaderUUID = _Root.AccessControlHeaderUUID
/* root of a user group */
association [1] to ZPH_R_AccessControlListTP as _Reason
  on $projection.AccessControlReasonUUID = _Reason.AccessControlHeaderUUID
{
  key AccessControlReferenceUUID,
      AccessControlHeaderUUID, AccCtrlReferencedObjectUUID,
      AccessControlReasonUUID, Creationdatetime,
      Createdby,
      LastChangeDateTime,
      LastChangedBy, _Root,
      _Reason
}
```

FIG. 4C

```
@AccessControl.authorizationCheck: #NOT_ALLOWED
@ObjectModel: {
  representativeKey: 'AccessControlReferenceUUID', usageType: {
    dataClass:       #TRANSACTIONAL,
    serviceQuality:  #A,
    sizeCategory:    #XL
  }
}
@EndUserText.label: 'Reference to object control. by this ACL'
define view entity ZPH_R_ACLObjRefByObjNumberTP as select from ZPH_R_ACLObjRefByObjectNumber as ORT
/* my Parent */
  association to parent ZPH_R_AccessControlListTP as _Root
    on $projection.AccessControlHeaderUUID = _Root.AccessControlHeaderUUID
/* root of a user group */
  association [1] to ZPH_R_AccessControlListTP as _Reason
    on $projection.AccessControlReasonUUID = _Reason.AccessControlHeaderUUID
{
  key AccessControlReferenceUUID,
      AccessControlHeaderUUID, AccCtrlReferencedObjectNumber,
      AccessControlReasonUUID,
      Creationdatetime,
      Createdby,
      LastChangeDateTime,
      LastChangedBy, _Root,
      _Reason
}
```

FIG. 4D

```
@AccessControl.authorizationCheck: #NOT_ALLOWED
@ObjectModel: {
  representativeKey: 'AccessControlUserUUID', usageType: {
    dataClass:       #TRANSACTIONAL,
    serviceQuality:  #A,
    sizeCategory:    #L
  }
}
@EndUserText.label: 'Access Control User entry'
define view entity ZPH_R_AccessControlUserTP as select from ZPH_R_AccessControlUser as UGT
/* my Parent */
association to parent ZPH_R_AccessControlListTP as _Root
  on $projection.AccessControlHeaderUUID = _Root.AccessControlHeaderUUID
/* root of the reason */
association [1] to ZPH_R_AccessControlListTP as _Reason
  on $projection.AccessControlReasonUUID = _Reason.AccessControlHeaderUUID
{
  key AccessControlUserUUID,
      AccessControlHeaderUUID,
      AccessControlUserid,
      AccessControlUserGroup,  //Added for PS-OP
      AccessControlReasonUUID, Creationdatetime,
      Createdby,
      LastChangeDateTime,
      LastChangedBy, _Root,
      _Reason
}
```

FIG. 4E

```
@AccessControl.authorizationCheck: #NOT_ALLOWED
@ObjectModel: {
  representativeKey: 'AccCtrlAuthznReferenceUUID', usageType: {
    dataClass:      #TRANSACTIONAL,
    serviceQuality: #A,
    sizeCategory:   #L
  }
}
@EndUserText.label: 'Reason ref. for updates to ACL entries'
define view entity ZPH_R_AccessControlReasonTP as select from ZPH_R_AccessControlListTP as _Root
/* my Parent */
association to parent ZPH_R_AccessControlHeaderUUID as ART
on $projection.AccessControlHeaderUUID = _Root.AccessControlHeaderUUID
{
  key AccCtrlAuthznReferenceUUID,
      AccessControlHeaderUUID,
      AccessControlFrameworkCode,
      AccessControlFrameworkUUID, Creationdatetime,
      Createdby,
      LastChangeDateTime,
      LastChangedBy, _Root
}
```

FIG. 4F

```
@AccessControl: {
  authorizationCheck:    #NOT_ALLOWED,
  auditing: {
    type: #CUSTOM,
    specification: 'change documents on Enterprise Projects'
  },
  personalData.blocking:  #BLOCKED_DATA_EXCLUDED
}
@ObjectModel: {
  representativeKey: 'AccCtrlReferencedObjectUUID',
  usageType: {
    dataClass:      #TRANSACTIONAL,
    serviceQuality: #A,
    sizeCategory:   #XL
  }
}
@EndUserText.label: 'ACL entries for UUID based objects'
define view entity ZPH_R_ACLByUUID as select from zph_acl_obj_auth as ACL
  inner join zph_acl_ref_uuid as ORT on ACL.accesscontrolledobjectuuid = ORT.accesscontrolheaderuuid
  inner join zph_acl_usr_grp as UGT on ACL.accesscontrolusergroupuuid = UGT.accesscontrolheaderuuid
{
  key ACL.accesscontrolrestrictioncode  as AccessControlRestrictionCode,
  key ORT.accctrlreferencedobjectuuid   as AccCtrlReferencedObjectUUID,
  key UGT.accesscontroluserid           as AccessControlUserid
}
```

FIG. 4G

```
@AccessControl: {
    authorizationCheck:    #NOT_ALLOWED,
    auditing: {
        type: #CUSTOM,
        specification: 'change documents on Projects'
    },
    personalData.blocking:  #BLOCKED_DATA_EXCLUDED
}
@ObjectModel: {
    representativeKey: 'AccCtrlReferencedObjectNumber',
    usageType: {
        dataClass:      #TRANSACTIONAL,
        serviceQuality: #A,
        sizeCategory:   #XL
    }
}
@EndUserText.label: 'ACL entries for Number based objects'
define view entity ZPH_R_ACLByNumber as select from zph_acl_obj_auth as ACL
  inner join zph_acl_ref_objn as ORT on ACL.accesscontrolledobjectuuid = ORT.accesscontrolheaderuuid
  inner join zph_acl_usr_grp as UGT on ACL.accesscontrolusergroupuuid = UGT.accesscontrolheaderuuid
{
    key ACL.accesscontrolrestrictioncode    as AccessControlRestrictionCode,
    key ORT.accctrlreferencedobjectnumber   as AccCtrlReferencedObjectNumber,
    key UGT.accesscontroluserid             as AccessControlUserid
}
```

FIG. 4H

```
managed implementation in class zph_cl_r_accesscontrollisttp unique;
strict;

define behavior for ZPH_R_AccessControlListTP alias Root
persistent table ZPH_ACL_HEADER
lock master
authorization master ( instance )
etag master LastChangeDateTime
{
 create;
 update;
 delete;
 field ( readonly, numbering : managed ) AccessControlHeaderUUID;
 field ( readonly:update, mandatory : create ) AccessControlTypeCode;

validation ACL_root on save { field AccessControlTypeCode; } association _ACLEntry { create ( features : instance) ; }
 association _ACLReason { create ( features : instance) ; }
 association _AuthorizedUser { create ( features : instance) ; }
 association _RefByObjectNumber { create ( features : instance) ; }
 association _RefByObjectUUID { create ( features : instance) ; }
} define behavior for ZPH_R_AccCtrlObjAuthznTP alias Auth
persistent table ZPH_ACL_OBJ_AUTH
lock dependent by _Root
authorization dependent by _Root
etag master LastChangeDateTime
{
 update;
 delete;
 field ( readonly, numbering : managed ) AccCtrlObjAuthorizationUUID;
 field ( readonly:update ) AccessControlHeaderUUID;
// field ( readonly ) Createdby, CreationDateTime, LastChangedBy, LastChangeDateTime;  //Commented for PS-OP
 field ( mandatory ) AccessControlRestrictionCode, AccessControlledObjectUUID,
AccessControlUserGroupUUID;

validation ACL_Auth on save { field AccessControlRestrictionCode, AccessControlledObjectUUID,
AccessControlUserGroupUUID, AccessControlHeaderUUID; }   //Commented for PS-OP association _UserGroup;
 association _ObjectReference;
 association _Root;
}
```

FIG. 41

```
managed implementation in class zph_cl_r_accesscontrollisttp unique;
strict;

define behavior for ZPH_R_AccessControlListTP alias Root
persistent table ZPH_ACL_HEADER
lock master
authorization master ( instance )
etag master LastChangeDateTime
{
 create;
 update;
 delete;
 field ( readonly, numbering : managed ) AccessControlHeaderUUID;
 field ( readonly:update, mandatory : create ) AccessControlTypeCode;

validation ACL_root on save { field AccessControlTypeCode; } association _ACLEntry { create ( features : instance) ; }
 association _ACLReason { create ( features : instance) ; }
 association _AuthorizedUser { create ( features : instance) ; }
 association _RefByObjectNumber { create ( features : instance) ; }
 association _RefByObjectUUID { create ( features : instance) ; }
} define behavior for ZPH_R_AccCtrlObjAuthznTP alias Auth
persistent table ZPH_ACL_OBJ_AUTH
lock dependent by _Root
authorization dependent by _Root
etag master LastChangeDateTime
{
 update;
 delete;
 field ( readonly, numbering : managed ) AccCtrlObjAuthorizationUUID;
 field ( readonly:update ) AccessControlHeaderUUID;
// field ( readonly ) Createdby, CreationDateTime, LastChangedBy, LastChangeDateTime;   //Commented for PS-OP
 field ( mandatory ) AccessControlRestrictionCode, AccessControlledObjectUUID, AccessControlUserGroupUUID;

validation ACL_Auth on save { field AccessControlRestrictionCode, AccessControlledObjectUUID, AccessControlUserGroupUUID, AccessControlHeaderUUID; }   //Commented for PS-OP association _UserGroup;
 association _ObjectReference;
 association _Root;
}
```

FIG. 4J

```
define behavior for ZPH_R_AccessControlReasonTP alias Reason
persistent table ZPH_ACL_REASON
lock dependent by _Root
authorization dependent by _Root
etag master LastChangeDateTime
{
 update;
 delete;
 field ( readonly, numbering : managed ) AccCtrlAuthznReferenceUUID;
 field ( readonly:update ) AccessControlHeaderUUID;
// field ( readonly ) Createdby, CreationDateTime, LastChangedBy, LastChangeDateTime;   //
Commented for PS-OP
 field ( mandatory ) AccessControlFrameworkCode;

validation ACL_Reason_Type on save { field AccessControlFrameworkUUID,
AccessControlHeaderUUID; } association _Root;
} define behavior for ZPH_R_AccessControlUserTP alias User
persistent table ZPH_ACL_USR_GRP
lock dependent by _Root
authorization dependent by _Root
etag master LastChangeDateTime
{
 update;
 delete;
 field ( readonly, numbering : managed ) AccessControlUserUUID;
 field ( readonly:update ) AccessControlHeaderUUID;
// field ( mandatory ) AccessControlUserid, AccessControlReasonUUID;   //Commented for PS-OP validation ACL_User_to_Reason on save { field AccessControlUserid, AccessControlReasonUUID,
AccessControlHeaderUUID; } association _Root;
 association _Reason;
}
```

FIG. 4K

```
define behavior for ZPH_R_ACLObjRefByObjNumberTP alias RefByNumber
persistent table ZPH_ACL_REF_OBJN
lock dependent by _Root
authorization dependent by _Root
etag master LastChangeDateTime
{
 update;
 delete;
 field ( readonly, numbering : managed ) AccessControlReferenceUUID;
 field ( readonly:update ) AccessControlHeaderUUID;
 field ( mandatory ) AccCtrlReferencedObjectNumber, AccessControlReasonUUID;

validation ACL_RefByNmbr on save { field AccCtrlReferencedObjectNumber,
AccessControlReasonUUID, AccessControlHeaderUUID; } association _Root;
 association _Reason;

} define behavior for ZPH_R_ACLObjRefByObjUUIDTP alias RefByUUID
persistent table ZPH_ACL_REF_UUID
lock dependent by _Root
authorization dependent by _Root
etag master LastChangeDateTime
{
 update;
 delete;
 field ( readonly, numbering : managed ) AccessControlReferenceUUID;
 field ( readonly:update ) AccessControlHeaderUUID;
 field ( mandatory ) AccCtrlReferencedObjectUUID, AccessControlReasonUUID;

validation ACL_RefByUUID on save { field AccCtrlReferencedObjectUUID,
AccessControlReasonUUID, AccessControlHeaderUUID; } association _Root;
 association _Reason;
}
```

FIG. 4L

```
@EndUserText.label: 'Auth Aspect ACL by UUID'
ACCESSPOLICY ZPH_AS_ACLByUUID {
  ASPECT ZPH_AS_ACLByUUID as
    SELECT FROM ZPH_R_ACLByUUID
      WITH USER ELEMENT AccessControlUserid
      with filter elements( AccessControlRestrictionCode )
      { AccCtrlReferencedObjectUUID }
}
```

FIG. 4M

```
@EndUserText.label: 'Auth Aspect ACL by UUID'
ACCESSPOLICY ZPH_AS_ACLByNumber {
  ASPECT ZPH_AS_ACLByNumber as
    SELECT FROM ZPH_R_ACLByNumber
      WITH USER ELEMENT AccessControlUserid
      with filter elements( AccessControlRestrictionCode )
      { AccCtrlReferencedObjectNumber }
}
```

FIG. 4N

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder                                                  ⎫
    as select from                                                              ⎬─ 508
                    vbak                                                        ⎭
                         ⎫
    left outer to one join vbkd on  vbak.vbeln = vbkd.vbeln
                                and vbkd.posnr = '000000'
    association [0..*] to I_SampleSalesOrderItem as _Item
        on $projection.SalesOrder = _Item.SalesOrder
    association [0..1] to I_SampleCurrency as _TransactionCurrency
        on $projection.TransactionCurrency = _TransactionCurrency.Currency
    association [0..1] to I_SampleCustomer as _SoldToParty
        on $projection.SoldToParty = _SoldToParty.Customer
{
    @Search.defaultSearchElement: true
    key cast(vbak.vbeln as vdm_sales_order preserving type) as SalesOrder,
        @ObjectModel.association.type: [#TO_COMPOSITION_CHILD]   //Composition
        _Item,
        vbak.vkorg                                       as SalesOrganization,
        vbak.auart                                       as SalesOrderType,
        vbak.vtweg                                       as DistributionChannel,
        @ObjectModel.foreignKey.association: '_SoldToParty'
        vbak.kunnr                                       as SoldToParty,
        _SoldToParty,
        @DefaultAggregation: #SUM
        @Semantics.amount.currencyCode: 'TransactionCurrency'
        vbak.netwr                                       as TotalNetAmount,
        @Semantics.currencyCode: true
        @ObjectModel.foreignKey.association: '_TransactionCurrency'
        vbak.waerk                                       as TransactionCurrency,
        _TransactionCurrency,
        ...
}
where vbak.vbtyp = 'C';
```

FIG. 5

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'        604
@Analytics.dataCategory: #DIMENSION
@AccessControl.authorizationCheck: #CHECK
@Metadata.allowExtensions: true
@Search.searchable: true
define view I_SampleSalesOrder
  as select from         vbak
    left outer to one join vbkd on  vbak.vbeln = vbkd.vbeln
                                and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]   //Composition
  _Item,
  vbak.vkorg                                as SalesOrganization,
  vbak.auart                                as SalesOrderType,
  vbak.vtweg                                as DistributionChannel,
  @ObjectModel.foreignKey.association: '_SoldToParty'
  vbak.kunnr                                as SoldToParty,
  _SoldToParty,
  @DefaultAggregation: #SUM
  @Semantics.amount.currencyCode: 'TransactionCurrency'
  vbak.netwr                                as TotalNetAmount,
  @Semantics.currencyCode: true
  @ObjectModel.foreignKey.association: '_TransactionCurrency'
  vbak.waerk                                as TransactionCurrency,
  _TransactionCurrency,
  ...
}
where vbak.vbtyp = 'C';
```

```
                                                                608
@EndUserText.label: 'Auto assigned role for I_SampleSalesOrder'
@MappingRole: true
define role I_SampleSalesOrder {
  grant select on I_SampleSalesOrder
  where ( SalesOrderType ) =
  aspect pfcg_auth ( v_vbak_aat,
                     auart,
                     actvt = '03' );
}
```

```
                                                                612
@Metadata.layer: #CORE
annotate view I_SampleSalesOrder
with
{
  @UI.lineItem: [{importance: #HIGH }]
  SalesOrder;
  @UI.lineItem: [{importance: #HIGH }]
  SalesOrderType;
}
```

```
                                                                616
@AbapCatalog.sqlViewAppendName: 'XINSAMPLEISO'
@EndUserText.label: 'Sales Order Extension India'
extend view I_SampleSalesOrder with X_IN_I_SampleSalesorder
{
  _SoldToParty.CustomerClassification
}
```

FIG. 6

DATA AUTHORIZATION EVALUATION FRAMEWORK

FIELD

The present disclosure generally relates to determining whether access to data, such as data associated with, or stored in, a computing object, is authorized. Particular implementations relate to the transformation of data in a design time data model to a runtime data model that is more performant in evaluating data access requests.

BACKGROUND

Modern software applications can provide access to a vast variety of data. Often, users interact with data using one or more software applications, but the underlying data is stored elsewhere, such as a relational database system. Many users, including users belonging to different groups or having different roles in an organization, may use the software applications, and their needs and responsibilities for the data may differ. For a variety of reasons, it can be desirable to restrict access to data to users who have a legitimate need for such data, and to provide different types of access rights even amongst such users. While some users may be permitted to read data, it may be desirable to restrict their ability to modify the data, or the definitions of data objects that define how the data stored. For other users, it may be desirable to provide broader access rights, such as providing the rights to insert, modify, or delete data, or the rights to perform such actions with respect to the definitions of data objects defining how and what data is stored. Other users may not be permitted any access to particular data.

Different types of access controls can be provided to restrict access to data. Different users can have responsibilities for defining or modifying access rights, in some cases even as to the same set of data (such as data associated with particular database objects, such as tables or views, where the access rights can optionally be indirectly specified with respect to objects of a virtual data model that refer to other virtual data model objects, or objects in a database). The ability to create or modify data access permissions can represent another level of data permissions, in addition to controlling read/write access.

At some point, end users are typically responsible for defining different types of access permissions. Access permissions are often defined using user interface screens to make it simpler for a user to define access permissions. Access permissions can also often be defined in various ways, such as specifying access permissions with respect to objects (that contain data or can be used to interact with data) or specifying access permissions for users, groups of users, or user roles. Unfortunately, many systems store data access permission information in a manner that makes it more convenient for users to define access rights, but result in resource-intensive evaluation of such access rights during runtime. For example, if data permissions are stored in multiple locations, expensive database operations such as UNION and non-linear JOIN operations can be required in order to evaluate whether a particular data access request is authorized. Performance can also suffer when hierarchical data objects may be involved—such as when an authorization hierarchy may need to be evaluated at multiple levels before it can be determined whether a requested action is permitted. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for evaluating data access restrictions. Data access restrictions are defined for a first computing object that includes data, or is usable to retrieve data, from one or more other computing objects. Data defining the data access restrictions is stored in attributes for a first plurality of computing objects. Values for less than all of the attributes are copied to a second plurality of computing objects, where the second plurality of computing objects is less than the first plurality of computing objects. A data access authorization request is received that includes, or information sufficient to identify, a user or user group identifier, and an identifier of the first computing object. Data is retrieved from at least a portion of one or more computing objects, and is returned in response to the request, or an authorization result is determined and returned in response to the request.

In one aspect, the present disclosure provides a process for evaluating data access restrictions. User input is received that defines data access restrictions for a first computing object that includes data or is useable to retrieve data from one or more other computing objects. Data defining the data access restrictions is stored in a first plurality of computing objects, computing objects of the first plurality of computing objects having respective schemas defining respective pluralities of attributes for storing data in an instance of their respective schemas. Values for less than all of the plurality of attributes for a second plurality of the first plurality of computing objects are copied into one or more computing objects of a data access authorization schema, the second plurality of the first plurality of computing objects being less than all of the first plurality of computing objects.

A first data access authorization analysis request is received. The first data access authorization analysis request includes, or includes information sufficient to identify, a user identifier or a user group identifier, and an identifier of at least the first computing object. Data is retrieved from at least a portion of the one or more computing objects to provide retrieved data. The retrieved data is returned in response to the first data access authorization analysis request, or the retrieved data is evaluated to determine a first data access authorization result, where the first data access authorization result is returned in response to the first data access authorization analysis request.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 4A-4N provide example code for example implementations of disclosed technologies.

FIG. 5 is code for an example metadata model, such as for an object of a virtual data model, which refers to data in one or more data objects of a database.

FIG. 6 is code for an example metadata model for a view of a virtual data model, and for metadata models which modify or refer to such example metadata model.

DETAILED DESCRIPTION

Example 1—Overview

Figure 1:
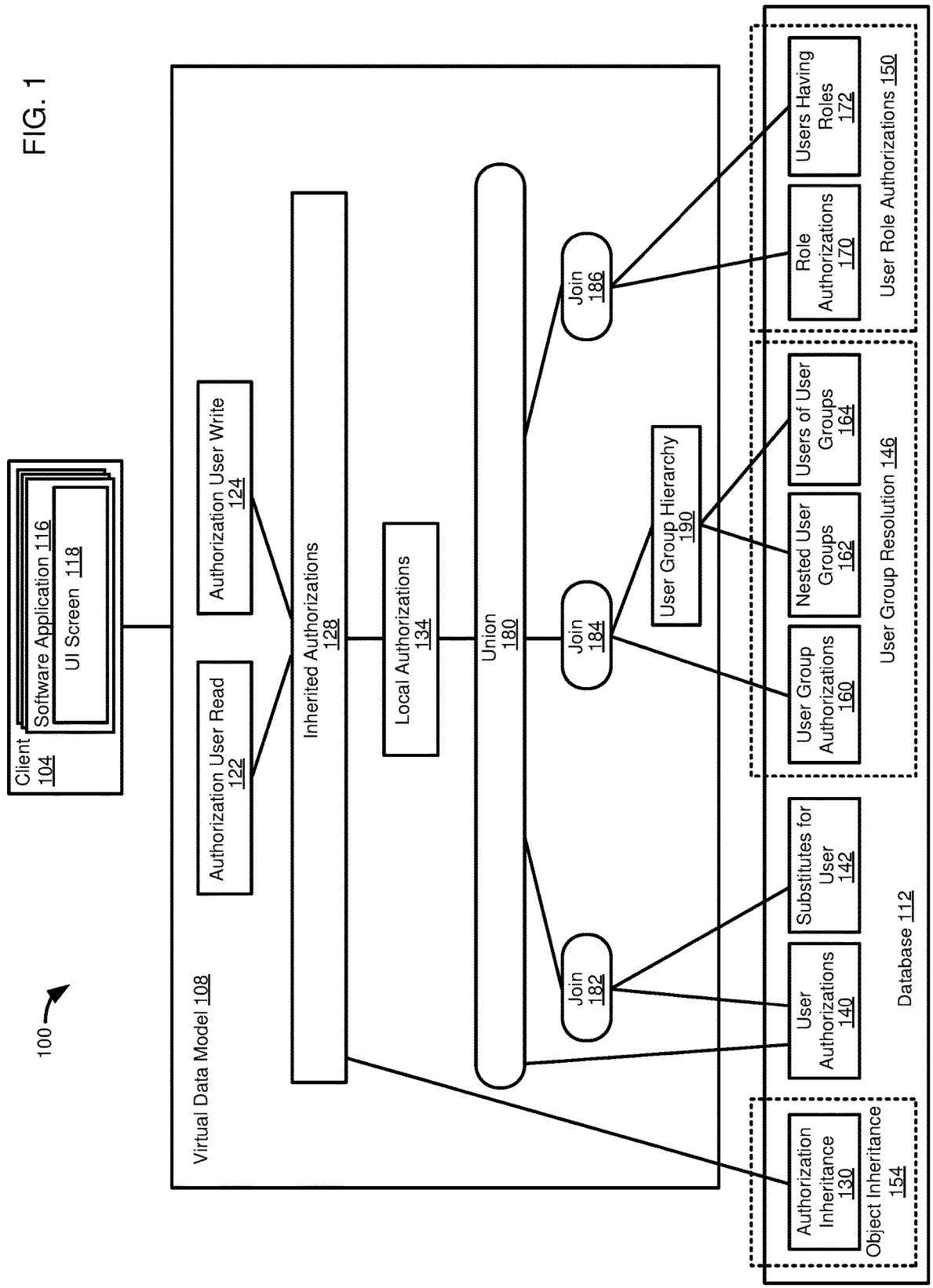
FIG. 1 is a diagram an example computing environment that can be used to define authorizations for data, including based on objects that contain or provide access to such data.

Modern software applications can provide access to a vast variety of data. Often, users interact with data using one or more software applications, but the underlying data is stored elsewhere, such as a relational database system. Many users, including users belonging to different groups or having different roles in an organization, may use the software applications, and their needs and responsibilities for the data may differ. For a variety of reasons, it can be desirable to restrict access to data to users who have a legitimate need for such data, and to provide different types of access rights even amongst such users. While some users may be permitted to read data, it may be desirable to restrict their ability to modify the data, or the definitions of data objects that define how the data stored. For other users, it may be desirable to provide broader access rights, such as providing the rights to insert, modify, or delete data, or the rights to perform such actions with respect to the definitions of data objects defining how and what data is stored. Other users may not be permitted any access to particular data.

Different types of access controls can be provided to restrict access to data. Different users can have responsibilities for defining or modifying access rights, in some cases even as to the same set of data (such as data associated with particular database objects, such as tables or views, where the access rights can optionally be indirectly specified with respect to objects of a virtual data model that refer to other virtual data model objects, or objects in a database). The ability to create or modify data access permissions can represent another level of data permissions, in addition to controlling read/write access.

At some point, end users are typically responsible for defining different types of access permissions. Access permissions are often defined using user interface screens to make it simpler for a user to define access permissions. Access permissions can also often be defined in various ways, such as specifying access permissions with respect to objects (that contain data or can be used to interact with data) or specifying access permissions for users, groups of users, or user roles. Unfortunately, many systems store data access permission information in a manner that makes it more convenient for users to define access rights, but result in resource-intensive evaluation of such access rights during runtime. For example, if data permissions are stored in multiple locations, expensive database operations such as UNION and non-linear JOIN operations can be required in order to evaluate whether a particular data access request is authorized. Performance can also suffer when hierarchical data objects may be involved—such as when an authorization hierarchy may need to be evaluated at multiple levels before it can be determined whether a requested action is permitted. Accordingly, room for improvement exists.

Disclosed techniques can address the issues noted above by creating new objects that store information that can be used to evaluate data access requests. Rather than being stored in a manner that facilitates user interaction with permissions information, the data objects are defined to be computationally inexpensive to process. Data from design time objects, used in defining permissions, is incorporated into data objects that are evaluated at runtime, or data objects can have pointers to the appropriate data in the design time objects.

At least certain disclosed innovations can be particularly useful in column store databases. Disclosed innovations can also be useful in modern database systems, such as SAP HANA, available from SAP SE of Walldorf, Germany, which can have different "engines" for processing different types of data operations. Using existing access control lists technologies, the HANA database may use the "compute" engine, due to the complexity of the database operations involved in processing authorization requests/checks when authorization is stored in a schema primarily designed to facilitate user definition of authorization information. In contrast, having a schema that is designed for fast runtime execution, the JOIN engine of HANA can be used, which can be more performant than the compute engine, in addition to performance improvements resulting from data reorganization/simplified data access operations.

Another advantage provided by the more performant schema for runtime evaluation is that more complex modeling/design time systems can be used, since the data will get extracted (or reference by pointers) and put in the simplified runtime schema.

Example 2—Example Computing Environment Useable to Define Access Restrictions

FIG. 1 illustrates a computing environment 100 where access control information can be defined. The computing environment 100 generally includes a client 104, a virtual data model 108, and a database 112. In particular examples, the virtual data model 108 can be CDS (Core Data Services) views as used in technologies available from SAP SE of Walldorf, Germany. The database 112 can be the HANA database, also available from SAP.

The client 104 can host one or more software applications 116, which can respectively provide one or more user interface screens 118 for defining access control information, including for performing create, read, update, or delete operations, at least to the extent a given user is authorized to perform such actions. The software applications 116 can also be used to submit requests to the virtual data model 108 or the database 112 to create, read, update, or delete data, where the data can be stored in the database 112 in one or more tables or views, and where the virtual data model can have data objects that reference such tables or views. These data objects of the virtual data model 108 and the database 112 are not illustrated in FIG. 1 for simplicity of presentation. Access to data can be restricted using data associated with other data objects of the virtual data model 108 and the database 112 that are illustrated in FIG. 1.

The virtual data model 108 can include data objects that are called when a read request is received, data object 122, or when a write request (including to create, modify, or delete data) is received, data object 124. The data objects 122, 124 can be views, or information associated with views, which can specify authorization information. In some cases, the data objects 122, 124 can be specified as separate data objects, and then the data objects can be merged with a data object that contains or provides access to the actual data that is subject to the access restrictions. The data object 122, 124 can act as filters for other data access commands. For instance, assume a user requests a particular selection of data that involves a particular table of the database 112, such as "SELECT*from TABLE1 where Date<1/1/2024." Since this is a read operation, data object 122 might be used in conjunction with another data object of the virtual data model (which refers, directly or indirectly, to TABLE1) to add a further WHERE condition "SELECT*from TABLE1 where Date<1/1/2024 AND Access=Authorized), where "Access=Authorized" can represent conditions associated with underlying data (such as, for example, restricting access to data associated with a particular product, a particular department of an organization, or a particular geographic area).

In determining what authorizations may exist for the read or write data objects 122, 124, a data object 128 can be used to evaluate inherited authorization, where inherited authorization information can be stored in a data object 130 of the database 112. Access control information, including implemented as access control lists, can be stored in a set of hierarchically arranged objects. Because of the hierarchical nature of the objects, it may be necessary to search multiple levels of the object hierarchy to determine whether access may be permitted using an inherited authorization. Examples of hierarchical objects include those used in the Portfolio and Project Management access control technology available from SAP SE of Walldorf, Germany. The objects include object types of portfolio, bucket, item, initiative, review, collections, and decision points. Bucket objects can be arranged under portfolio objects, and bucket, item, review, collection, and initiative objects can be arranged under bucket objects. Decision point objects can be arranged under item objects, and decision point, phase, or item of initiative objects can be arranged under initiative objects.

An authorization check can also examine local authorizations using an object 134. Local authorizations 134 can be used to provide more specific access to a user for particular data objects. Various rules can be used to handle conflicts between access rights provided via inheritance and access rights provided by local authorization, either in terms of access being authorized or not, or a degree or scope of access rights, either in terms of data to which access is granted or denied, or in terms of permitted/prohibited operations (for example, read only access, or both read/write access).

Local authorizations can be of different types, such as being maintained in data objects for users 140, substitutes for users 142, in objects associated with a user group resolution category 146, or in objects associated with a user role authorization category 150. Note that user group resolution 146 and user role authorization 150 can be considered as authorization categories, along with an object inheritance category 154 that includes the data object 130.

The user data object 140 can directly specify authorization information for discrete users. Authorizations can specify data objects for which a user is authorized, or particular data thereof (such as data identified by a particular query), as well as the types of authorized operations. The substitutes for users object 142 can represent "delegation" of all or a portion of authorizations of a user represented in the data object 140. For example, consider a first employee who is going on leave. During the period they are gone, they may wish to delegate their authorization to a second employee who is assuming their responsibilities, thus temporarily "substituting" the second employee for the first employee. Or, that first employee may have a number of responsibilities, and may wish to delegate some of the responsibilities to the second employee. Other responsibilities of the first employee could be delegated to third, fourth, or further employees.

In some cases, substitute users can be defined by the user with the relevant authorization. Substitute authorizations can be managed in different ways depending on a desired use scenario. For example, a question can arise as to whether both the "original" user and the substitute user should have concurrent authorization rights, or whether the substitute user results in the original user no longer having particular authorizations for a substitution period.

The user group resolution category 146 can include a number of data objects that can store authorization information. A data object 160 can store authorization for user groups, where a user group can be associated with a particular subject matter area, role, or combination thereof. In some scenarios, user groups can be nested. For example, one user group may be created for "employees," and there may be subgroups of employees having different roles. Nested user groups can have hierarchical relationships, where lower-level groups, nested under one or more higher level groups, can inherent authorizations from parent groups. Nesting information can be stored in a data object 162. Optionally, the data object 160 stores root user groups, and the data object 162 stores both nesting information and definitions (such as authorizations) associated with user groups nested under a root user group. A data object 164 can store information about users in various user groups, whether the user groups are root nodes or are nested under some other node.

Note that determining permissions for a particular user using the data objects 160, 162, 164 can be computationally complex. For example, if a user identifier is provided, it may be necessary to analyze multiple user groups to determine whether a particular authorization exists.

For the user role authorization category 150, a data object 170 can include authorizations associated with different user roles. A data object 172 can store information about what roles are assigned to particular users. In some cases, a user can have multiple roles, and so it may be necessary to search multiple entries of the data object 170 for a given user identifier of the data object 172 to determine whether a particular authorization exists.

Authorizations from the different categories 146, 150, 154 can "overlap" in various ways. In some cases, this can result from having multiple systems/software applications where authorizations can be specified, or otherwise tailoring the presentation/definition of authorization information for particular use scenarios. As mentioned in Example 1, the availability of having multiple ways of specifying authorization information, in ways that are user friendly, can be helpful for users, but can make the evaluation of authorization requests computationally complex.

As an example of the computational complexity in evaluating authorizations in the computing environment 100, consider that evaluating local authorizations 134 can involve a comparatively expensive UNION operation 180. UNION operations can be expensive, as they can require a "sort distinct" operation. However, because of the multiple ways in which authorizations can be maintained, any possible source of authorization is typically evaluated.

Further, the already expensive UNION operation 180 includes a direct select operation from the user authorizations data object 140 and three JOIN operations 182, 184, 186. JOIN operation 182 joins data from the user authorizations data object 140 and the user substitutes data object 142. The JOIN operation 184 is a more complex join of the user group authorization data object 160 and a user group hierarchy object 190 that is defined with respect to the nested user groups data object 162 and the users of user groups data object 164. As previously discussed, the inclusion of hierarchies can result in expensive, non-linear joins. Finally, the JOIN operation 186 combines the user role authorizations data object 170 and the users data object 172.

Example 3—Example Data Schema for Storing Authorization Information for Runtime Use Disclosed innovations include multiple technical advancements that improve the speed, and reduce the complexity, associated with conducting authorization checks. In one aspect, the present disclosure separates access control/authorization software features into a design time implementation and a runtime implementation. This stands in contrast to typical prior approaches, where the same implementation was used for both design time activities (defining authorizations) and runtime activities (evaluating authorizations). As discussed in Example 1, user convenience was often prioritized, resulting in a monolithic approach that prioritized the definition of authorizations at the expense of executing authorization checks.

Typically, prior techniques also maintained authorization information on an authorization object by authorization object level, meaning that multiple objects needed to be consulted before an authorization decision could be made. Disclosed techniques can help address the issues caused by this arrangement by consolidating object information into a smaller number of objects, and by "flattening" data that might otherwise be maintained in a hierarchical structure, or in a series of structures seeking to maintain hierarchy information.

Figure 2:
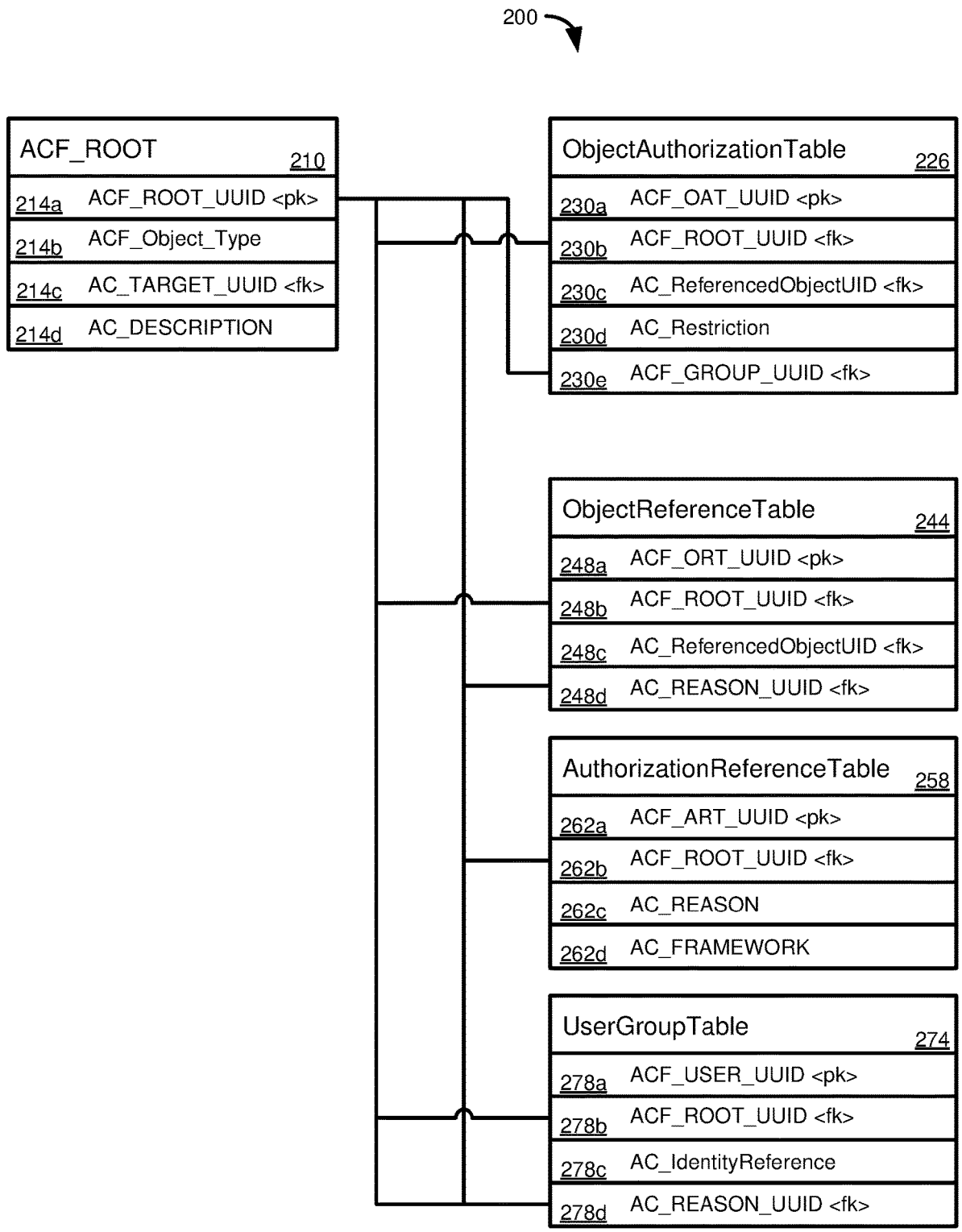
FIG. 2 is an example schema for storing authorization data that can be used during runtime to determine whether requested operations for data or associated objects are authorized.

FIG. 2 illustrates a schema, or data model, 200 that can be used to store authorization information that allows for more performant authorization checks. Data included in the objects of the schema 200 can be obtained from other sources, such as the various objects/data objects described in conjunction with FIG. 1, at least certain components of which can represent a design time framework useable with the schema of FIG. 2. The data can be physically copied into the objects of the schema 200, or can be referenced using pointers. The use of pointers can be beneficial, as it can reduce storage requirements and the use of computing resources to perform updates on objects of the schema 200 when authorization information, such as associated with the computing environment 100, is created, updated, or deleted.

For convenience of presentation, objects of the schema 200 will be described as tables, such as relational database tables. More specifically, objects shown in the schema 200 correspond to definitions of tables that can be used to store authorization information, and where actual authorization information can be stored in instances of the table definitions. A table 210 can serve as a "root" object that can be used to link other tables 226, 244, 258, 274. That is, the table 210 can be used to link information/records in the tables 226, 244, 258, 274. In at least some implementations, the table 210 is not used in processing authorization requests.

Note that the "root object" of the table 210 can be implemented in various forms, from simply being an entry in the table 210 to being a more complex data type, including a logical data object, as described in Example 9. In a particular example, objects represented in the table 210 are BusinessObjects, as implemented in technologies of SAP SE of Walldorf, Germany, and more particularly as RAP (RESTful application programming) BusinessObjects. Having RAP objects can, among other things, help provide greater/easier access for conducting authorization checks, including by remote systems that may have different operational protocols than the system in which the schema 200 is implemented and processed.

A particular authorization can be associated with an identifier for that authorization, as a value for an identifier attribute 214*a* of the table 210, and which serves as the primary key for entries in a table having the schema of the table 210. The value for the identifier attribute 214*a* can be a universally/globally unique identifier. An attribute 214*c* can be used to identify a particular object (such as a table or view in a relational database system, or a view or other object in a virtual data model that references such a table or view) that is subject to access restrictions.

As will be further explained, the tables 226 and 244 can be used together to capture hierarchical relationships. In a particular implementation, in the case of hierarchical/inherited authorizations, the root object of the hierarchy serves as the value of the attribute 214*c*, and additional entries are not created in the table 210 for nested objects based on the inherited authorization. That is, the table 210 can include entries for a particular object for authorizations that are not inherited from another object.

Although a single attribute 214*c* is illustrated for storing an identifier of a referenced object, particularly when the schema 200 will be used for multiple different sources of authorizations, object identifiers can be stored in different formats/datatypes. In such cases, the table 210 can optionally be modified to include multiple attributes serving the purpose of the attribute 214*c*, differing in their datatypes.

The table 210 can include additional attributes, such as attributes 214*b* and 214*d*, where the attribute 214*b* can be used to identify a type of object represented in the table 210, and the attribute 214*d* can provide a description of the particular authorization, which can be useful, for example, if a human wishes to view information about entries in the tables of the schema 200. Values for the type attribute 214*b* will be further described, but generally a given object represented by an entry in the table 210, that is, a primary key value, is associated with a single type. Objects of different types can have different relationships between the tables 226, 244, 258, 274. Example values for the attribute 214*b* include:

Authorization definition
User-group definition
Reason definition
Referenced object—UUID based
Referenced object—character based The table 226 can be used to store authorizations for objects, which can be objects as described with respect to the data object 130 of FIG. 1. However, objects can be specified in another manner, such as specifying particular objects of a physical or virtual data model that are associated with restrictions. In addition to storing the primary key (UUID value) for the entry in the table 226 in attribute 230*a*, the table 226 includes the associated entry in the table 210

(primary key 214a) as a foreign key value in an attribute 230b. The object that is subject to a restriction is identified in an attribute 230c, and the nature of the restriction is specified in an attribute 230d. Values of the attribute 230c can be foreign keys to objects that are subject to restrictions specified using objects in a design time framework.

The attribute 230d can be associated with codes that represent various authorization rules. For example, a rule can specify read access or read/write access, or any other desired set of restrictions. In a more specific implementation, access control codes can include:

READ Read permission
UPDATE Update (write) permission
CREATE Create permission for objects as sub-nodes/objects for a specified object
DELETE Delete permission
ADMIN Administrative authorizations (for example, allowed to modify permissions information)
FINANCIAL Allows access to financial information, such as costs, associated with a given object A user identifier or user group identifier can be specified in an attribute 230e, which can be a foreign key to a user group having entries in the table 274, as will be further described. In practice, when an authorization check is to be conducted, the tables 226 and 274 can be joined to determine whether a particular user is part of a user group that is authorized for a particular action with respect to an object associated with restriction information in an entry of the table 226.

In other implementations, individual user authorizations can be determined from group memberships and stored directly in the table 226, rather than obtaining such information from a JOIN with another table (table 274 in the schema 200). However, including user information in the table 226 can result in duplicative data. A given approach can be selected based on considerations such as performance/computing resource use. Note that, for performance reasons, it may be preferable to use a single approach, rather than duplicating some data in the table 226 and having other data be retrieved through a JOIN with the table 274.

Objects that inherent restrictions/permissions through another object, specified by a value of the attribute 230c, can be recorded in the table 244. Thus, the combination of the tables 226 can be used to "flatten" hierarchical relationships. An attribute 248a serves as the primary key for the table 244. The primary key value of the table 210, attribute 214a, can be used to correlate nested objects, in the table 244, with root objects, in the table 226 (attribute 230c), using the foreign key value provided by an attribute 248b, which can be linked to the attribute 230b via a JOIN condition.

The object subject to an authorization restriction can be identified using an attribute 248c, which can serve as a foreign key to a primary key value of a restricted object (an object that contains restricted data, or which can be used to access such data). Since an object can be associated with direct, or local, authorizations, as well as inherited authorizations, such an object can be associated with an entry in the table 226, for local authorizations, as well as an entry in the table 244, which provides authorizations inherited through another object included in an entry of the table 226.

The table 244 further includes an attribute 248d that associates records of the table with records of the table 258, which stores reference information for authorizations. The attribute 248d is a foreign key that references to the primary key value of the attribute 262a.

Turning to the table 258, in addition to the attribute 262a, the primary key, and the attribute 262b, a foreign key to the table 210, the table 258 includes an attribute 262c that represents a reason for a particular authorization, which can be an object-based authorization or a user-based authorization. That is, the reason attribute 262c can serve as a link between a design time schema (such as having components of FIG. 1) and the runtime schema 200. In some cases, a particular unique primary key value for the attribute 262a can be associated with multiple reasons (corresponding to multiple authorizations defined in one or more design time systems), in which case a value of the reason attribute 262c can serve as a key to identify a particular of such multiple reasons. A given reason, value of the attribute 262c, can be associated with particular values for a framework identifier attribute 262d. As discussed, in at least some implementations, authorizations can be provided using different authorization frameworks, which can have different user interfaces/procedures and data objects for defining authorizations and storing authorization information. The value of the reason attribute, and optionally the framework attribute 262d, can identify, such as through a foreign key relationship, a particular record of an object in one of the data objects 140, 142, 160, 162, 164, 170, or 172 of FIG. 1. Because of the different sources of authorizations, there can be multiple authorizations (entries in the table 226) for a given referenced object and a given user or user group, which can be identical (including with respect to particular authorizations that have been granted for an object), apart from the value of the field 262c.

The table 274 can store information related to users, user groups, or user roles. As discussed, the table 274 includes an attribute 278a serving as a primary key and an attribute 278b that serves as a foreign key to the table 210 (attribute 214a). An attribute 278c provides an identifier for a particular user, and an attribute 278d links entries to particular authorization reasons of the table 258 (using its primary key, 258a).

The use of the tables 210, 226, 244, 258, 274 is now further described. Although the root table 210 is typically not used in JOIN operations, the primary key value associated with the attribute 214a can be used to establish links between the tables 226, 244, 258, 274, which are used, including in JOIN operations, to evaluate access requests. A reason for this can include that use of the type attribute 214b can help provide a loose coupling between a group object type and a particular access context. However, this loose coupling could result in cyclic database operations if used directly in query processing statements/operations, and so the object identifiers provided by the attribute 214a can instead be used indirectly, making access control operations more performant.

In a particular implementation, values for the object type attribute 214b can include an authorization definition, a user-group definition, or a reason definition. Consider first the authorization definition type. This type describes operations that are allowed for specified objects, such as through a referenced object identifier of the attribute 230c of the table 226. For a given root object value (primary key attribute 210a), all entries in the object authorization table refer to the same referenced object—having the same value for the attribute 230c. If there are multiple entries for a particular referenced object for a particular object of the table 210, each entry will have a different value for the restriction attribute 230d. That is, the table 226 should not have duplicate rows.

For an object of the table 210 having a "user-group" type for the attribute 214b, only the user group table need be used in a JOIN operation. There can be multiple entries (primary key values 278a) in the table 274 for a single instance of a user-group object instance, since multiple users can have the same access rights for a given object.

For an object of the table 210 having a "reason" value for the attribute 214*b*, the table 258 need only be referenced, and the object of the table 210 allows for the determination of where an authorization was created, external to the schema 200. For example, when used with the computing environment 100 of FIG. 1, the values of the authorization references table 258 can identify whether an authorization was a direct assignment, an authorization based on substitution, an authorization based on a user-group, or an authorization based on a user role, where the relevant framework and authorization can be provided by values for the attributes 262*c* and 262*d*.

Note that various changes can be made to the schema 200 without departing from the scope of the current disclosure, including combining (denormalizing) some or all of the tables 226, 244, 258, 274. However, an advantage of having the tables arranged as in FIG. 2 is that it can reduce the amount of processing required when particular data is updated.

Example 4—Example Authorization Checks with Design Time and Runtime Frameworks

Figure 3:
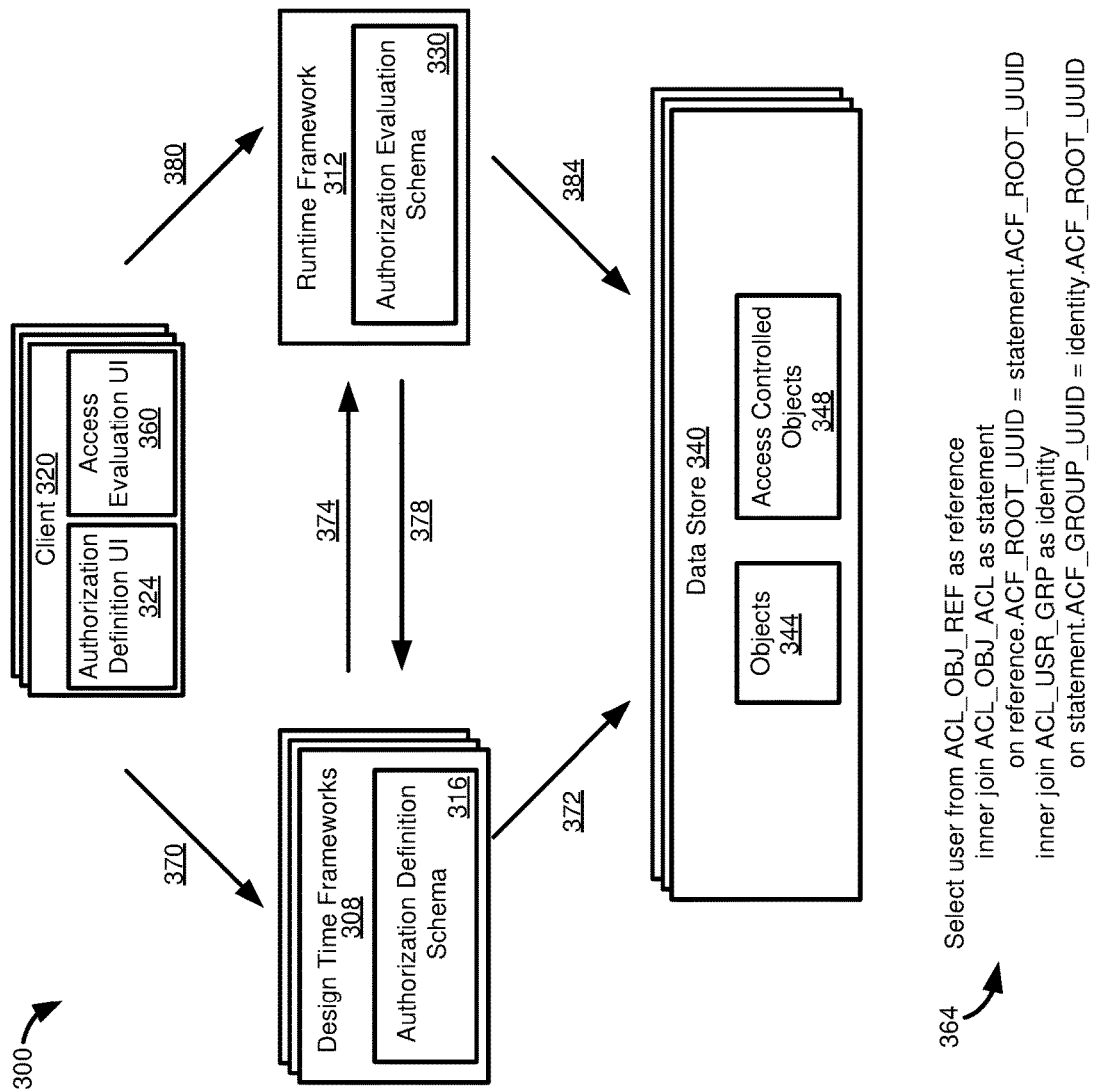
FIG. 3 an example computing environment in which disclosed innovations can be implemented.

FIG. 3 illustrates an example computing environment 300 in which disclosed techniques can be implemented. The computing environment 300 generally includes one or more design time frameworks 308 and a runtime framework 312. The computing environment 100 of FIG. 1 can represent an example design time framework 308, although FIG. 1 also illustrates the computing environment being used for both defining and evaluating authorizations. The runtime framework 312 can store at least a portion of authorization information in the design time frameworks 308. However, as discussed in conjunction with Examples 1 and 3, the design time framework can have authorization definition schemas 316 that are adapted to be used with authorization definition user interfaces 324 of one or more clients 320.

The authorization definition schemas 316 can be optimized for user convenience in defining authorizations, but can suffer from performance issues if used to evaluate authorization requests. Issues with the authorization definition schemas 316 can include having hierarchically arranged authorization components, such as object or user hierarchies. In addition, even a single design time framework 308 can include multiple ways of generating authorizations, which may require multiple data objects in a schema 316 to be evaluated before it can be determined whether an access request is authorized. In addition, executing runtime requests can be more complex, as different frameworks may have different evaluation protocols/interfaces.

The runtime framework 312 include an authorization evaluation schema 330, which can be, or be similar to, the schema 200 of FIG. 2. Compared with the authorization definition schema 316, the authorization evaluation schema 330 can be more performant by storing a smaller volume of data, such as data needed to evaluate an authorization request, rather than data that may be needed by a user in defining authorizations. The authorization evaluation schema 330 can also flatten hierarchies that may exist in the authorization definition schemas 316. The authorization evaluation schema 330 can provide further benefits, such as enabling a common authorization evaluation process/interface, even when different authorization definition schemas 316 were used to create authorizations, as incorporating data into the authorization evaluation schema can involve converting data to a common schema.

FIG. 3 further illustrates a data store 340, where the data store 340 can store objects 344 that are not accessed-controlled and objects 348 that are accessed-controlled. For the accessed-controlled objects 348, a given object can be subject to authorizations by more than one of the authorization schemas 316, or even by multiple computing objects within a given authorization schema.

In addition to the authorization definition user interface 324, a given client 320 can include one or more access evaluation user interfaces 360, where input through such a user interface can be used to generate an authorization query or request, such as the request 364.

In practice, a client 320 can submit authorization definition requests 370 to a design time framework 308. In performing these requests 370, data can be retrieved from the data store 340 in a process 372, such as to determine what objects are available for authorization restrictions and their properties.

A portion of the data of an authorization definition schema 316 can be sent to the runtime framework 312 in a communication 374. For example, triggers or similar mechanisms associated with objects of an authorization definition schema 316 can be used to cause data to be sent to the runtime framework. Or, commands that implement design changes can call functions of the runtime framework 312 to update data in the authorization evaluation schema 330. Alternatively, or additionally, objects of the authorization evaluation schema 330 can include pointers 378 that can be used to directly access values stored in an authorization definition schema 316.

A client 320 can send an authorization evaluation request 380 to the runtime framework 312. Depending on implementation, the runtime framework 312 can return information in the runtime evaluation schema 330 to the client 320, where the client can determine whether access is authorized, or the runtime framework (or another component of the computing environment 300) can determine whether access is authorized. If access is authorized, requested actions 384 can be performed on access-controlled objects 348 of the data store 340.

Returning to the example request 364, given a particular user identifier, the request 364 requests the performance of inner JOIN operations on the tables 256 and 226, and the tables 226 and 274 of FIG. 2, using the identifier of a particular authorization object of the table 210 as a JOIN condition. The results can then be evaluated to determine whether a record exists for the user with respect to a particular accessed-controlled object, and optionally with respect to a specific action requested for the access-controlled object. Optionally, the request 364 can be modified to include particular access-controlled objects or access control codes directly, such as through the use of one or more WHERE clauses.

Example 5—Example Implementations of Runtime Objects and Runtime Operations

FIGS. 4A-4N illustrate example implementations of disclosed techniques. FIG. 4A is an example CDS view that can serve as an instance of the table 210 of the schema 200 of FIG. 2. FIG. 4B is an example CDS view that can be used to view the contents of a single authorization.

FIG. 4C is an example CDS that can be used to find a reference to an authorization-controlled object, where the authorization-controlled object is identified by a UUID. FIG.

4D is an example CDS that can be used to find a reference to an authorization-controlled object, where the authorization-controlled object is identified by a character-based identifier.

FIG. 4E is an example CDS view that can be used to access users associated with a particular user group. FIG. 4F is an example CDS view that can be used to implement the table 258 of FIG. 2. In particular, the definition of the view can result in the creation of a table in a database, where the view can then be used to access/manipulate data in such table.

FIG. 4G is an example CDS view that can be used to evaluate permissions for an object having a UUID based key, while FIG. 4H is an example CDS view that can be used to evaluate permissions for an object having a character-based key.

FIGS. 4I-4L illustrate example code defining a logical data object (such as a BusinessObject) that defines the structure of an object represented by the table 410, and operations that can be performed using the logical data object.

FIGS. 4M and 4N represent, respectively, query language statements that can be used to evaluate authorization requests given a UUID-based object identifier or a character-based object identifier.

Example 6—Example Metadata Model

FIG. 5 illustrates a definition of a metadata model 500. The metadata model 500, in particular, represents a view, such as a Core Data Services view of SAP SE, of Walldorf, Germany. The metadata model 500 can include a variety of different components, at least some of which can be considered to be metadata models. That is, the metadata model 500 can be a model that is based at least in part on multiple sub-models. The sub-models can specify particular aspects of the overall metadata model 500.

The metadata model 500 can optionally include one or more annotations 504. An annotation can be a metadata component that can be added to a metadata model. For example, a provider may supply a base model, and individual users or customers may wish to add metadata that is specific to their operating environment and use cases. The ability to add annotations can thus enhance usability by allowing for custom metadata elements, without impacting other users of a base metadata model. Annotations can be specified for different software layers or frameworks.

In the example shown, annotations 504 can be indicated as annotations using particular syntax elements, such as by preceding an annotation with the "@" symbol. In at least some cases, annotations 504 can also be indicated by placing them in the appropriate portion of a metadata model, such as in a header section or another section designated for annotations. In some cases, annotations 504 can reference other metadata models, such as a metadata model of a data source, or can reference a data source that is associated with a metadata model. In either event, such an association 504 can create a dependency between the metadata model 500 and the other metadata model/data source.

The metadata model 500 can include instructions 508, in this case a SQL statement 510, defining a core metadata model/object having an identifier 512 (which can be used, for example to later access or activate, such as to instantiate, the metadata model). In particular, the instructions 508 shown define a view. The annotations 504 further specify properties of the view, as do other portions of the metadata model 500 that will be further described.

The instructions 508 can specify one or more data sources 516. Data sources 516 can define data to which at least a portion of the metadata of the metadata model 500 will apply, and can also supply additional metadata for the metadata model 500. Note that the metadata model 500 can be, in at least a sense, dependent on referenced data sources 516. For example, if the metadata model 500 relies on particular expected data or metadata of a data source 516, the metadata model may be unusable, have performance issues, or provide incorrect results if the referenced data sources do not include expected data or metadata, or are otherwise inconsistent with how the data source is used in the metadata model. As shown, the data sources 516 includes two tables, "vbak" and "vbkd." These tables will typically include metadata features such as one or more fields, where each field is associated with a data type, designations of a primary key, and optionally associations with other database components, such as association or foreign key relationships with other database tables.

The metadata model 500 can optionally include specifications of one or more associations 520. An association 520 can define a relationship to another entity. An association 520 can be processed during the use of the metadata model 500, such as being converted to a SQL expression such as a JOIN. Unlike other conditions or elements that are included in the metadata model 500, associations can define a relationship that can at least in some cases be optional, such as being selectively activated depending upon how the metadata model is accessed. For example, an association 520 can be converted to a JOIN condition that uses a table provided in a SELECT statement that references the metadata model 500.

The metadata model 500 can include one or more components 522 that specify how data retrieved using the metadata model should be processed, including to generate values that are associated with other metadata elements of the metadata model. Processing can include calculating values, such as using a formula specified in, or referenced by, the metadata model 500. In particular, a processing component 522 can specify that a particular field value should be treated as an element 524. Thus, the metadata model 500 can include dependencies on how elements are defined, and the metadata model 500 may not be accurate, or uscable, if the element definition does not match how it is used, and intended to be used, in the metadata model 500.

The metadata model 500 can optionally include additional components, such as one or more conditions 528, or other operations, such as aggregations, unions, etc., including such operations that are typically supported by a database query language. In addition to instantiated artifacts, information about the artifacts can be stored in a persistency model, such as one or more database tables. An example persistency model that can be used with artifacts is disclosed in U.S. patent application Ser. No. 16/387,983, filed Apr. 18, 2019, and incorporated by reference herein.

Example 7—Example Metadata Model, Including Relationships with Other Metadata Models FIG. 6 illustrates how metadata models may have dependencies on other metadata models. In particular, FIG. 6 shows a view metadata model 604, which can be the metadata model 500 of FIG. 5. FIG. 6 also illustrates a metadata model 608 for an access control object (such as a DCLS, or data control language source), a metadata model 612 for a metadata extension object (such as a DDLX, or metadata extension), and a metadata model 616 for an extension element object (such as a DDLS, or data definition language source).

The access control object metadata model 608 can be used for restricting access to data that can be retrieved using the view metadata model 604. For example, the view metadata model 604 and the access control object metadata model 608 can be processed together when the view metadata model 604 is activated, such as to generate SQL commands that retrieve data for the view metadata model, but which are filtered or restricted based on the access control object metadata model. As the access control object metadata model 608 references the view metadata model 604, the access control object metadata model depends on the view existing, and on the view containing elements specified in the access control object metadata model. For example, the access control object metadata model references the "SalesOrderType" element of the view "I_SampleSalesOrder" and the authorization object "V_VBAK_AAT" with its authorization field "AUART." Thus, the first element would be undefined or unusable if the corresponding element did not exist in the view metadata model 604.

Figure 7:
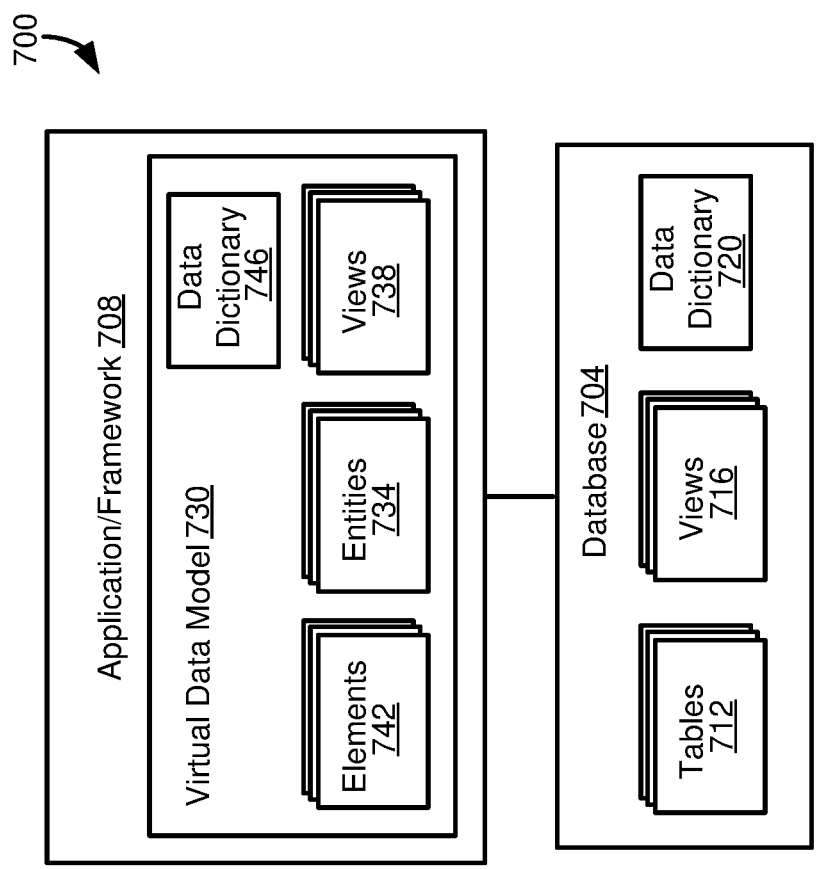
FIG. 7 is a diagram of a computing environment illustrating how a virtual data model can interact with a database system.

Example 8—Example Computing Environment Having Virtual Data Model Interacting with Database System FIG. 7 illustrates an example computing environment 700 in which disclosed technologies can be implemented. At a high level, the computing environment 700 includes a database system 704 that can communicate with an application or framework layer 708. The database system 704 includes data that can be used by the application/framework layer 708, or applications that communicates with the application/framework layer. The data can be stored in one or more tables 712 of the database 708. The data can be referenced by one or more views 716, which can be view definitions or materialized views (which can then also correspond to tables 712). A data dictionary 720 can store information regarding the tables 712 and the views 716.

The application/framework layer 708 includes a virtual data model 730. The virtual data model 730 can include entities 734 and views 738, which can at least generally correspond to the tables 712 and the views 716 of the database 708. However, as has been described, as compared with the tables 712 and views 716, artifacts in the virtual data model 730 are typically associated with additional information, such as semantic information or information that can be used to manipulate data in one or more artifacts of the database 708 that corresponds to a given artifact in the virtual data model. The virtual data model 730 can include information regarding elements 742, which can correspond to attributes or fields used in the entities 734 and views 738. At least some of the elements 742 can correspond to fields used in the database 704, but are enriched with additional information. Information regarding the entities 734, views 738, and elements 742 can be stored in a data dictionary 746 of the virtual data model 730.

Generally, as used in the present disclosure, a data artifact (or object, or computing object) refers to an artifact in the virtual data model 730 that is intended for direct use by a user or application. A data artifact can include data elements, including those that refer to data stored in the database 704 (which can also be objects or computing objects, but are also referred to as data objects). However, a data artifact can also include metadata elements, which can describe data elements, or how the data artifact can be used or how it may be processed. Data elements and metadata elements can be collectively referred to as components of an artifact.

Example 9—Example Logical Data Object Schema

In any of the Examples described herein, a logical data object be a specific example of an object in an object-oriented programming approach. However, unless the context specifically indicates otherwise, aspects of the present disclosure described with respect to logical data objects can be applied to other types of objects, or other types of data collections. For example, a database table, or a group of related tables, can have fields that are analogous to data members of an object. Functions that correspond to member functions of an object can be defined to perform operations on the tables.

A logical data object can contain a definition of a hierarchical data structure and definitions of one or more operations that can be performed using portions of the hierarchical data structure. In some cases, a logical data object may be referred to as a "business object" and can take any number of forms including business intelligence or performance management components such as those implemented in software technologies of SAP BusinessObjects, ORACLE Hyperion, IBM Cognos, and others. However, the use of logical data objects in computer applications is not limited to "business" scenarios. Logical data objects can be used to define a particular application and/or problem domain space. Aspects and artifacts of a given problem domain can be defined using the hierarchical data structure and various portions of these aspects and/or artifacts can be associated directly with definitions of relevant logical operations. A logical data object can be an artifact of a virtual data model, or can be constructed with reference to artifacts of a virtual data model. In turn, components of the virtual data model can be mapped to another data model, such as a physical data model of a relational database system.

Figure 8:
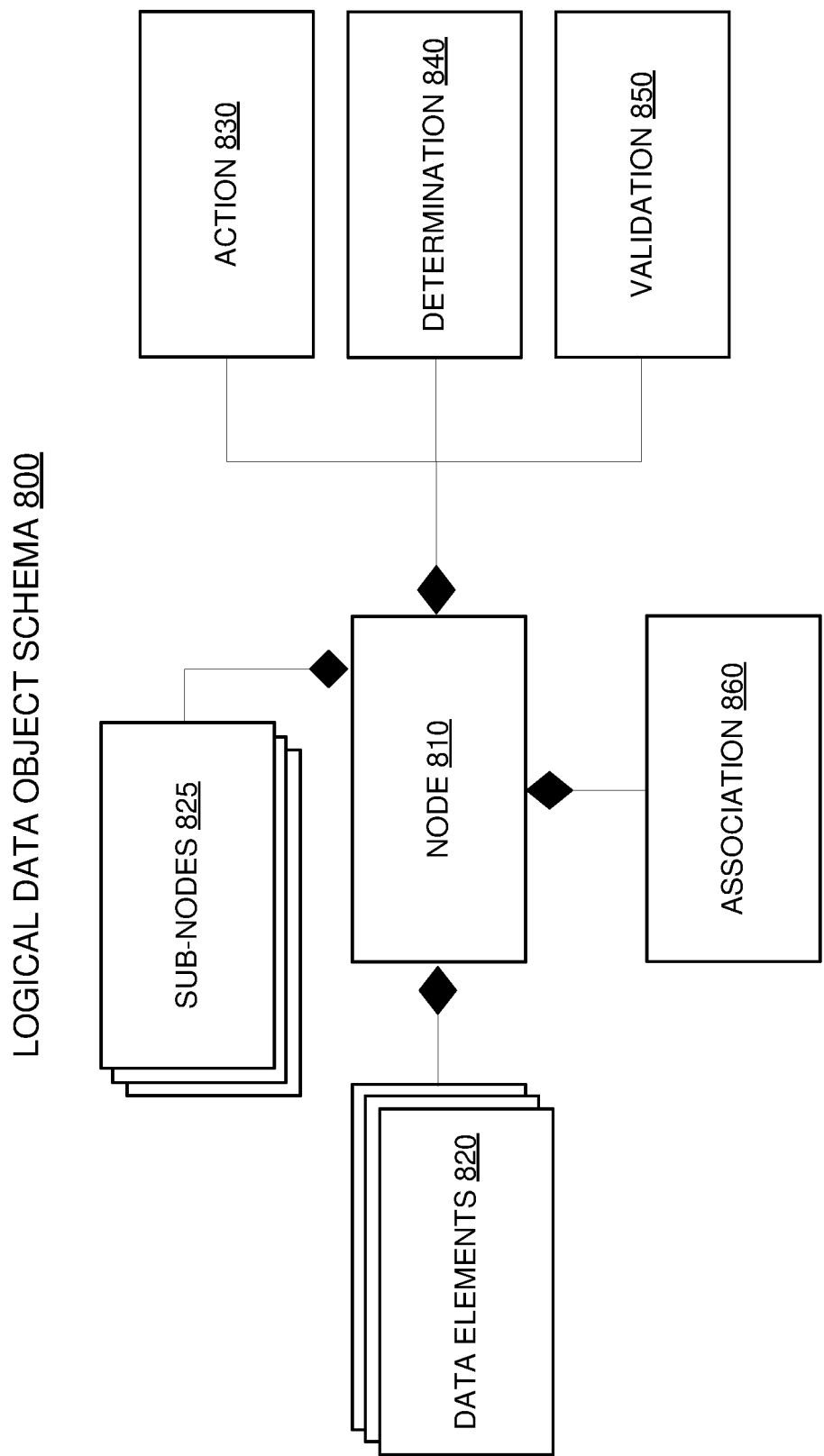
FIG. 8 is a block diagram depicting a schema for a logical data object.

FIG. 8 is a diagram of an example logical data object schema 800. A node 810 can contain one or more data elements 820 (i.e., variables, such as data members). A data element 820 can contain an identifier, such as a name, and an associated value. The identifier can, for example, be associated with a field of a particular database table. In at least some embodiments, the data element 820 can be associated with a data type that restricts and/or validates the type of data that can be stored as a value of the data element 820.

The node 810 can contain one or more child nodes 825 (also referred to as sub-nodes), which can themselves contain additional data elements 820 (and other node components, including sub-nodes 825). Combinations of sub-nodes 825 can be used to define a hierarchical data structure of multiple nodes 810. In at least some embodiments, the hierarchical data structure can contain a root node that does not have a parent-node and can be used as an entry point for traversing the hierarchical data structure.

Each node 810 in the logical data object can be associated with one or more actions 830. An action 830 can comprise a definition for a logical operation that can be performed using the node 810 with which it is associated. The action 830 can contain an identifier that can be used to invoke the action's logical operation. Each node 810 in the logical data object can be associated with one or more determinations 840. A determination 840 can contain a definition for a logical operation that can be automatically executed when a trigger condition is fulfilled. Example trigger conditions can include a modification of the associated node 810, a modification of the data element 820 of the associated node, the creation of a data element 820 of the associated node, etc. A logical operation defined by an action 830, or a determination 840, can comprise instructions to create, update, read, and/or delete one or more data elements 820 and/or one or more sub-nodes 825. Actions 830 or determinations 840 can be set to trigger, in some cases, upon the occurrence of a particular date (e.g., a particular date or a particular time on a particular date).

Each node 810 in the logical data object schema 800 can be associated with one or more validations 850. A validation 850 can contain a definition of one or more data integrity rules and/or checks. The one or more data integrity rules and/or checks can be performed when the associated node 810, and/or one or more data elements 820 of the associated node, are created, modified, and/or deleted. Any such operation that does not satisfy the one or more data integrity rules and/or checks can be rejected.

Each node 810 in the logical data object schema 800 can be associated with one or more nodes from one or more other logical data objects (having the same schema or a different schema) by one or more associations 860. An association 860 can contain an identifier for a node in another logical data object that is associated with the node 810. Associations 860 can be used to define relationships among nodes in various logical data objects. The association 860, in at least some embodiments, contains an association type indicator that identifies a type of association between the node 810 and the node in the other logical data object.

Although the action 830 is defined and associated with the node 810, when the action 830 is invoked, it targets an identified instance of the node 810 with which it is associated. Similarly, a determination 840 and/or validation 850 can be defined and associated with a node 810, but can target an instance of the associated node 810 when it/they is/are invoked. Multiple instances of a given logical data object can be created and accessed independently of one another. Actions 830, determinations 840, or validations 850 may correspond to member functions of a data object, such as implemented in a C++ class.

Although the instances of the logical data object share a common schema 800, the data values stored in their respective node instances and data element instances can differ, as can the logical data object instances that are associated by the associations 860. Additionally, or alternatively, an instance of an association 860 can identify a particular instance of an associated node in another logical data object instance. The identifier of a node instance can be an alphanumeric string that uniquely identifies the instance and, in at least some cases, can be used to look the instance up and/or retrieve data associated with the instance. Particular examples of identifiers include numerical values and universally unique identifiers. However, other types of identifiers are also possible.

Various actions may be performed using logical data objects including create, update, delete, read, and query operations. If the requested operation is a read operation, the data payload may contain a unique identifier associated with a logical data object instance to be retrieved. Processing a read operation request can comprise searching for an instance of the logical data object that is associated with the provided unique identifier in a data store, and retrieving all or part of a matching logical data object instance's data from the data store. If the requested operation is an update operation, the data payload may contain one or more values to be assigned to data element instances of an existing logical data object instance. The data payload may also contain a unique identifier associated with the logical data object instance to be updated. Processing an update operation request can comprise searching for a logical data object instance in a data store associated with the provided unique identifier and updating the matching logical data object instance with the provided data values.

Example 10—Example Process for Conducting Authorization Check

Figure 9:
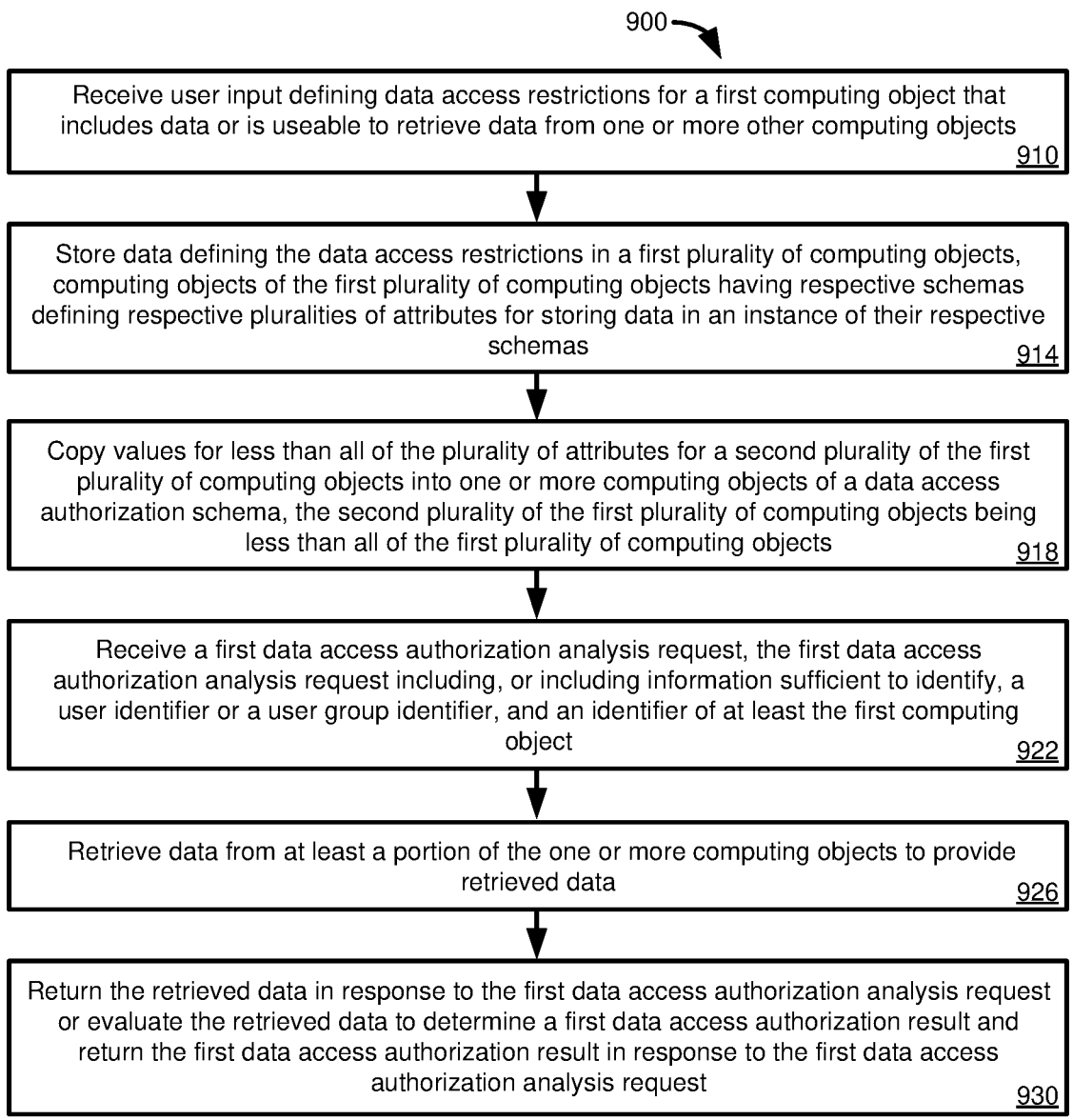
FIG. 9 is a flowchart of a process for evaluating data access restrictions

FIG. 9 is a flowchart of a process 900 for evaluating data access restrictions. In particular examples, the process 900 can use the data model of FIG. 2, and can be implemented in the computing environment 300 of FIG. 3.

At 910, user input is received that defines data access restrictions for a first computing object that includes data or is useable to retrieve data from one or more other computing objects. Data defining the data access restrictions is stored at 914 in a first plurality of computing objects, computing objects of the first plurality of computing objects having respective schemas defining respective pluralities of attributes for storing data in an instance of their respective schemas. At 918, values for less than all of the plurality of attributes for a second plurality of the first plurality of computing objects are copied into one or more computing objects of a data access authorization schema, the second plurality of the first plurality of computing objects being less than all of the first plurality of computing objects.

A first data access authorization analysis request is received at 922. The first data access authorization analysis request includes, or includes information sufficient to identify, a user identifier or a user group identifier, and an identifier of at least the first computing object. At 926, data is retrieved from at least a portion of the one or more computing objects to provide retrieved data. The retrieved data is returned at 930 in response to the first data access authorization analysis request, or the retrieved data is evaluated to determine a first data access authorization result, where the first data access authorization result is returned in response to the first data access authorization analysis request.

Example 11—Computing Systems

Figure 10:
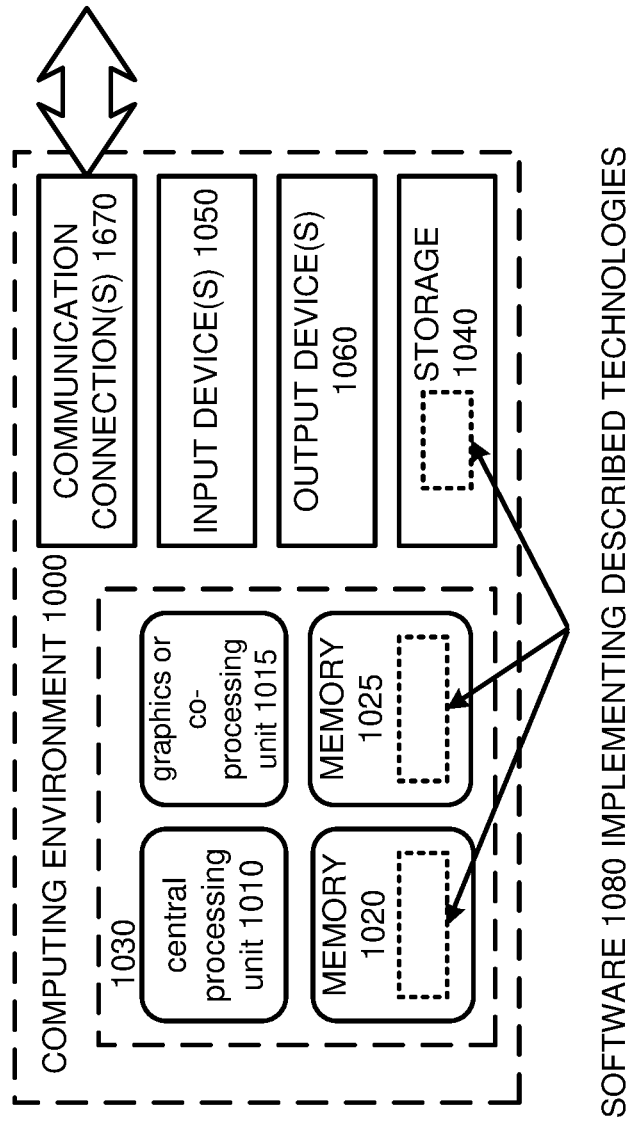
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the processes of the present disclosure. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015. The memory 1020, 1025, may also store settings or settings characteristics, databases, data sets, interfaces, displays, object instances, or model.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 11:
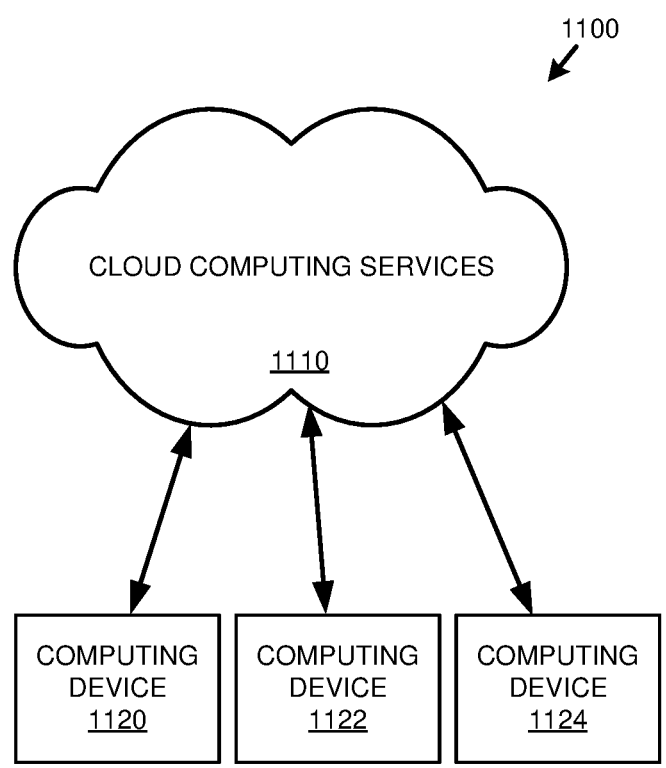
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:
      receiving user input defining data access restrictions for a first computing object that comprises data or is useable to retrieve data from one or more other computing objects;
      storing data defining the data access restrictions in a first plurality of computing objects, computing objects of the first plurality of computing objects having respective schemas defining respective pluralities of attributes for storing data in an instance of their respective schemas;
      copying values for less than all of the plurality of attributes for a second plurality of the first plurality of computing objects into one or more computing objects of a data access authorization schema, the second plurality of the first plurality of computing objects being less than all of the first plurality of computing objects;
      receiving a first data access authorization analysis request, the first data access authorization analysis request comprising, or comprising information sufficient to identify, a user identifier or a user group identifier, and an identifier of at least the first computing object;
      retrieving data from at least a portion of the one or more computing objects to provide retrieved data; and
      returning the retrieved data in response to the first data access authorization analysis request or evaluating the retrieved data to determine a first data access authorization result and returning the first data access authorization result in response to the first data access authorization analysis request.

2. The computing system of claim 1, wherein the copying values comprises flattening hierarchically arranged data of the second plurality of the first plurality of computing objects to provide flattened data, and the flattened data is stored in a second computing object of the one or more computing objects of the data access authorization schema.

3. The computing system of claim 2, wherein the hierarchically arranged data comprises hierarchically arranged user group data, the hierarchically arranged user group data comprising data for a plurality of hierarchically arranged user groups.

4. The computing system of claim 3, wherein the second computing object comprises a user group identifier attribute and a user identifier attribute.

5. The computing system of claim 2, wherein the hierarchically arranged data comprises data for a plurality of hierarchically arranged access-controlled computing objects.

6. The computing system of claim 5, wherein the second computing object comprises an anchor object attribute and a third computing object of the one or more computing objects of the data access authorization schema stores object identifiers for one or more dependent access-controlled data objects depending from an anchor object indicated by a value of the anchor object attribute.

7. The computing system of claim 1, wherein the first plurality of computing objects are part of a first authorization definition framework organized according to a first schema, the operations further comprising:

receiving user input defining data access restrictions for a second computing object that comprises data or is useable to retrieve data from one or more other computing objects, wherein the second computing object is the first computing object or is a computing object other than the first computing object;

storing data defining the data access restrictions in a third plurality of computing objects, the third plurality of computing objects being part of a second authorization definition framework organized according to a second schema, computing objects of the third plurality of computing objects having respective schemas defining respective pluralities of attributes for storing data in an instance of a respective schema, wherein at least a portion of schema of the third plurality of computing objects are different than schemas of the first plurality of computing objects; and copying values for at less than all of the plurality of attributes for a fourth plurality of the third plurality of computing objects into the one or more computing objects of the data access authorization schema, the fourth plurality of the third plurality of computing objects being less than all of the first plurality of computing objects.

8. The computing system of claim 7, the operations further comprising:

receiving a second data access authorization analysis request, the second data access authorization analysis request comprising, or comprising information sufficient to identify, a user identifier or a user group identifier, and an identifier of at least the second computing object;

retrieving data from at least a portion of the second plurality of computing objects to provide retrieved data; and returning the retrieved data in response to the second data access authorization analysis request or evaluating the retrieved data to determine a second data access authorization result and returning the second data access authorization result in response to the second data access authorization analysis request.

9. The computing system of claim 8, wherein the at least the second computing object is the first computing object.

10. The computing system of claim 1, wherein the one or more computing objects of the data access authorization schema comprise:

a root computing object, the root computing object comprising a root object identifier attribute and access-controlled object identifier attribute;

an object authorization computing object, the object authorization computing object comprising a first root computing object attribute, the first root computing object attribute storing values of the root object identifier attribute of the root computing object, an identifier of an access-controlled object attribute, an access control attribute defining an access control restriction for a particular access-controlled computing object indicated by an attribute value for the identifier of the access-controlled computing object identifier attribute, and a user or a user-group identifier attribute, the user or user-group identifier attribute useable to identify a user subject to an access control indicated by a value of the access control attribute.

11. The computing system of claim 10, wherein the user or user-group identifier attribute stores a value for a user-group and the one or more computing objects of the data access authorization schema further comprise:

a user-group computing object, the user-group computing object comprising a user-group identifier attribute and a user identifier attribute, the user identifier attribute identifying users belonging to a respective user-group indicated by a value of the user-group identifier attribute.

12. The computing system of claim 11, wherein the user-group computing object further comprises a second root computing object attribute, the second root computing object attribute storing values of the root object identifier attribute of the root computing object.

13. The computing system of claim 12, wherein the retrieving data from at least a portion of the one or more computing objects comprises performing a JOIN operation on the object authorization computing object and the user-group computing object using at least one value of the root object identifier attribute as a JOIN condition.

14. The computing system of claim 13, wherein in the root computing object is not referenced in the first data access authorization analysis request, or used in executing the first data access authorization analysis request.

15. The computing system of claim 11, the one or more computing objects of the data access authorization schema further comprising:

an authorization reference computing object, the authorization reference computing object comprising a third root computing object attribute, the third root computing object attribute storing values of the root object identifier attribute of the root computing object and a reason attribute, the reason attribute identifying an authorization source defined in the first plurality of computing objects.

16. The computing system of claim 15, wherein retrieving data from at least a portion of the one or more computing objects comprises performing one or more JOIN operations on the object authorization computing object, the user-group computing object, and the authorization reference computing object using at least one value of the root object identifier attribute as a JOIN condition.

17. The computing system of claim 11, the one or more computing objects of the data authorization schema further comprising:

an object reference computing object, the object reference computing object comprising a third root computing object attribute, the third root computing object attribute storing values of the root object identifier attribute of the root computing object and a dependent access-controlled object identifier, wherein the root object identifier attribute is useable to identify access-controlled computing objects depending from a given root access-controlled computing object.

18. The computing system of claim 17, wherein the retrieving data from at least a portion of the one or more computing objects comprises performing one or more JOIN operations on the object authorization computing object, the user-group computing object, and the object reference computing object using at least one value of the root object identifier attribute as a JOIN condition.

19. A method, implemented in a computing system comprising at least one hardware processor and at least one memory coupled to the at least one hardware processor, the method comprising:

receiving user input defining data access restrictions for a first computing object that comprises data or is useable to retrieve data from one or more other computing objects;

storing data defining the data access restrictions in a first plurality of computing objects, computing objects of the first plurality of computing objects having respective schemas defining respective pluralities of attributes for storing data in an instance of their respective schemas;

copying values for less than all of the plurality of attributes for a second plurality of the first plurality of computing objects into one or more computing objects of a data access authorization schema, the second plurality of the first plurality of computing objects being less than all of the first plurality of computing objects;

receiving a first data access authorization analysis request, the first data access authorization analysis request comprising, or comprising information sufficient to identify, a user identifier or a user group identifier, and an identifier of at least the first computing object;

retrieving data from at least a portion of the one or more computing objects to provide retrieved data; and returning the retrieved data in response to the first data access authorization analysis request or evaluating the retrieved data to determine a first data access authorization result and returning the first data access authorization result in response to the first data access authorization analysis request.

20. One or more computer-readable storage media comprising:

computer-executable instructions that, when executed by a computing system comprising at least one hardware processor and at least one memory coupled to the at least one hardware processor, cause the computing system to receive user input defining data access restrictions for a first computing object that comprises data or is useable to retrieve data from one or more other computing objects;

computer-executable instructions that, when executed by the computing system, cause the computing system to store data defining the data access restrictions in a first plurality of computing objects, computing objects of the first plurality of computing objects having respective schemas defining respective pluralities of attributes for storing data in an instance of their respective schemas;

computer-executable instructions that, when executed by the computing system, cause the computing system to copy values for less than all of the plurality of attributes for a second plurality of the first plurality of computing objects into one or more computing objects of a data access authorization schema, the second plurality of the first plurality of computing objects being less than all of the first plurality of computing objects;

computer-executable instructions that, when executed by the computing system, cause the computing system to receive a first data access authorization analysis request, the first data access authorization analysis request comprising, or comprising information sufficient to identify, a user identifier or a user group identifier, and an identifier of at least the first computing object;

computer-executable instructions that, when executed by the computing system, cause the computing system to retrieve data from at least a portion of the one or more computing objects to provide retrieved data; and computer-executable instructions that, when executed by the computing system, cause the computing system to return the retrieved data in response to the first data access authorization analysis request, or to evaluate the retrieved data to determine a first data access authorization result, wherein the first data access authorization result is then returned in response to the first data access authorization analysis request.

* * * * *